United States Patent [19]

Yamaguchi

[11] Patent Number: 5,686,983
[45] Date of Patent: Nov. 11, 1997

[54] PHOTOPRINTING METHOD WITH MEANS TO DETERMING THE ORIGINAL LIGHT SOURCE INCLUDING THE PRESENCE OR ABSENCE OF FLASHES OF LIGHT

[75] Inventor: Yoshihiro Yamaguchi, Kanagawa, Japan

[73] Assignee: Fuji Photo Film Co., Ltd., Kanagawa, Japan

[21] Appl. No.: 377,407

[22] Filed: Jan. 24, 1995

[30] Foreign Application Priority Data

Jan. 28, 1994 [JP] Japan .................................. 6-008882

[51] Int. Cl.⁶ .......................... G03B 27/80; G03B 27/72
[52] U.S. Cl. .................... 355/38; 355/68; 355/77; 356/41; 356/404
[58] Field of Search ........................ 355/18, 32, 67, 355/71, 77, 35, 38, 40, 41, 74; 356/402, 403, 404

[56] References Cited

U.S. PATENT DOCUMENTS

| | | | |
|---|---|---|---|
| 4,120,581 | 10/1978 | Takahashi et al. | 355/38 |
| 4,154,523 | 5/1979 | Rising et al. | 355/38 |
| 4,203,671 | 5/1980 | Takahashi et al. | 356/402 |
| 4,974,017 | 11/1990 | Terashita | 355/38 |
| 5,041,868 | 8/1991 | Suzuki | 355/68 |
| 5,081,485 | 1/1992 | Terashita | 355/38 |
| 5,300,381 | 4/1994 | Buhr et al. | 430/30 |
| 5,467,168 | 11/1995 | Kinjo et al. | 355/77 |
| 5,475,493 | 12/1995 | Yamana | 356/404 |

FOREIGN PATENT DOCUMENTS

| | | | |
|---|---|---|---|
| 3153231 | 7/1991 | Japan | G03B 27/72 |
| 4113347 | 4/1992 | Japan | G03B 27/72 |

*Primary Examiner*—Arthur T. Grimley
*Assistant Examiner*—Herbert Kerner
*Attorney, Agent, or Firm*—Sughrue,Mion,Zinn,Macpeak & Seas, PLLC

[57] ABSTRACT

An object of the present invention is to estimate subject illuminating light using the minimum number of on-photography information. When no flashes of light exist, color differences R–G and G–B are calculated based on image information detected by an image sensor and the calculated color differences are plotted on color coordinates. It is further determined whether R–G and G–B distributions fall within a fluorescent-lamp light region or a tungsten light region (106). If it is determined that the distributions fall within the fluorescent-lamp light region, then the subject illuminating light is estimated as light such as a night view or fireworks, which is emitted from a light source other than the fluorescent lamp, when an average intensity $(BV) \leq -1.5$ [EV]. Further, the subject illuminating light is estimated as the fluorescent-lamp light when $-1.5$ [EV]$<BV \leq 3$ [EV] and is estimated as daylight producing a green failure when 3 [EV]$<BV$. If it is determined that the distributions fall within the tungsten light region, then the subject illuminating light is estimated as tungsten light when $BV \leq 3$ [EV]. Further, the subject illuminating light is estimated as light obtained by mixing the tungsten light used as a principal part with light emitted from other light source when 3 [EV]$<BV \leq 6$ [EV] and is estimated as daylight low in color temperature or object-color light when 6 [EV]$<BV$. The degree of correction is changed based on the estimated subject illuminating light to execute a printing process.

13 Claims, 6 Drawing Sheets

PHOTOPRINTING METHOD WITH MEANS TO DETERMING THE ORIGINAL LIGHT SOURCE INCLUDING THE PRESENCE OR ABSENCE OF FLASHES OF LIGHT

BACKGROUND OF THE INVENTION

1. Field of the Invention

The present invention relates to a photoprinting method, and particularly to a method of automatically determining the quantity of printing light based on three R, G and B color density values of a film image to be printed and printing the film image on a sheet of printing paper based on the determined quantity of printing light.

2. Description of the Related Art

It has experimentally been known that the rate of transmission of tri-color light of R (Red), G (green) and B (Blue) transmitted through the entire screen of a color negative on which a standard scene has been photographed, is of a substantially constant rate in general. Further, a print condition is determined so that a color obtained by adding up and mixing densities printed on a sheet of color printing paper by the transmitted light over the entire screen becomes gray or a constant hue close to the gray. Therefore, the amount of printing light (amount of printing exposure) is determined in accordance with the following equation in an automatic printer:

$$\log E_j = K_j + D_j \qquad (1)$$

where log E, K, D and j respectively indicate logarithms of a printing light quantity E, a constant, an integrated density or level of transmitted-light (LATD) of a negative, which is measured by a light-measuring system, and color light of any of B, G and R.

However, when the printing light quantity is controlled by the automatic printer based on the above equation (1), a print produced from an underexposed negative on which a gray object or subject has been photographed, is high in density over its entirety as compared with a print produced from a suitable negative. Further, a print obtained from an overexposed negative becomes low in density. Therefore, the amount of exposure is determined by correcting the Dj expressed in the equation (1) using a slope control function. Even in the case of the automatic printer having the above slope control function, negatives such as a negative (negative by different type light-source) photographed by a light source (fluorescent lamp, tungsten lamp or the like) much different from daylight, a negative having a color failure, etc. tend to produce a color unbalance or a color deviation in color reproduction and form a defective print improper in color balance. Therefore, the Dj expressed in the equation (1) is further corrected (color-correction) so as to decide the amount of exposure. At this time, a correction excessive with respect to a normal correction is called a "high correction", whereas a correction reduced with respect to the normal correction is called a "lowered correction".

By automatically correcting the amount of printing exposure as described above, a color deviation in color reproduction of a negative by a different type light-source, and a color deviation in color reproduction which occurs due to a variation in film characteristics (such as a variation in performance due to film storage, a variation in performance due to a processing variation, or the like), can be corrected so as to efficiently produce a print satisfactory in finish quality.

Since, however, the photoprinting method as described above is premised on uniform print finishing, a tint or tone of subject illuminating light cannot be reflected in a print. A problem arises that a scene of the evening sun is converted into a scene of broad daylight, for example. To solve this problem, the amount of exposure may be determined by the lowered correction. Since, however, the color deviation in color reproduction due to the variation in film characteristics cannot be corrected, the finish quality of the print is lowered.

As a photoprinting method capable of solving the above problem and reflecting the color tone of the subject illuminating light in the print without lowering the finish quality, there has been proposed a photoprinting method disclosed in Japanese Patent Application Laid-Open Publication No. 3-153231, which estimates a color temperature of the subject illuminating light from information indicative of shooting data and time, the value of light quantity upon photography, the presence or absence of use of a stroboscope or flash and a shooting place and varies the correction degree based on the estimated color temperature.

However, the degree of accuracy and effects has not yet discussed specifically.

Further, a system using light-source type information indicative of fluorescent-lamp light, tungsten light and daylight or color temperature information has been proposed in Japanese Patent Application Laid-Open Publication No. 4-113347.

Since, however, such information must be recorded on the camera side, a problem arises that a burden on the camera side increases.

SUMMARY OF THE INVENTION

The present invention has been made to solve the above problems, it is therefore an object of the present invention to provide a photoprinting method capable of estimating the type of subject illuminating light using the minimum number of on-photography information to make the finish quality of a print satisfactory.

According to a first aspect of the present invention, for achieving the above object, there is provided a photoprinting method comprising the following steps of estimating the type of subject illuminating light based on information indicative of an average intensity obtained upon photography and information indicative of the presence or absence of flashes of light, determining the amount of printing exposure according to the estimated type of subject illuminating light, and thereby printing film images on a sheet of printing paper.

According to a second aspect of the present invention, there is provided a photoprinting method comprising the following steps of defining in advance a plurality of regions corresponding to subject illuminating light on color coordinates, based on feature amounts of three R, G and B color density values of a number of film images, determining whether a feature amount of three R, G and B color density values of a film image to be printed belongs to any of the plurality of regions and estimating the type of subject illuminating light from the result of determination, and determining the amount of printing exposure according to the estimated type of subject illuminating light to thereby print the film image on a sheet of printing paper.

According to a third aspect of the present invention, there is provided a photoprinting method comprising the following steps of defining in advance a plurality of regions corresponding to subject illuminating light on color coordinates, based on feature amounts of three R, G and B color density values of a number of film images, determining at least one reference average intensity for each of the plurality of regions in advance, measuring a feature amount of three R, G and B color density values of a film image when the film image is printed on a sheet of printing paper, determining whether the measured feature amount belongs to any of the plurality of predefined regions, reading information indicative of an average intensity of the printing film image, which is obtained upon photography, comparing the read average intensity upon the photography and the at least one reference average intensity predefined for each of the plurality of regions and estimating the type of the subject illuminating light from the result of comparison, and determining the amount of printing exposure according to the estimated type of subject illuminating light and printing the film image on a sheet of printing paper.

According to a fourth aspect of the present invention, there is provided a photoprinting method of correcting the amount of printing exposure determined based on three R, G and B color density values of a film image to be printed to thereby print the film image on a sheet of printing paper, comprising the following steps of increasing the degree of correction of the amount of printing exposure based on information indicative of a distance to a subject and a photography magnification when the distance to the subject is near and the photography magnification is large, setting the degree of correction of the amount of printing exposure to the medium when the distance to the subject and the photography magnification are near and small respectively and when the distance to the subject and the photography magnification are distant and large respectively, and reducing the degree of correction of the amount of printing exposure when the distance to the subject is distant and the photography magnification is small.

According to a fifth aspect of the present invention, there is provided a photoprinting method of correcting the amount of printing exposure determined based on three R, G and B color density values of a film image to be printed to thereby print the film image on a sheet of printing paper, comprising the following steps of estimating the type of subject illuminating light based on information indicative of an average intensity obtained upon photography and information indicative of the presence or absence of flashes of light and varying the degree of correction of the amount of printing exposure according to the estimated type of subject illuminating light, and increasing the degree of correction of the amount of printing exposure based on information indicative of a distance to a subject and a photography magnification when the distance to the subject is near and the photography magnification is large, setting the degree of correction of the amount of printing exposure to the medium when the distance to the subject and the photography magnification are near and small respectively and when the distance to the subject and the photography magnification are distant and large respectively, and reducing the degree of correction of the amount of printing exposure when the distance to the subject is distant and the photography magnification is small.

According to a sixth aspect of the present invention, there is provided a photoprinting method of correcting the amount of printing exposure determined based on three R, G and B color density values of a film image to be printed to thereby print the film image on a sheet of printing paper, comprising the following steps of defining in advance a plurality of regions corresponding to subject illuminating light on color coordinates, based on feature amounts of three R, G and B color density values of a number of film images, determining whether a feature amount of three R, G and B color density values of a film image to be printed belongs to any of the plurality of regions and estimating the type of subject illuminating light from the result of determination, varying the degree of correction of the amount of printing exposure according to the estimated type of subject illuminating light, and increasing the degree of correction of the amount of printing exposure based on information indicative of a distance to a subject and a photography magnification when the distance to the subject is near and the photography magnification is large, setting the degree of correction of the amount of printing exposure to the medium when the distance to the subject and the photography magnification are near and small respectively and when the distance to the subject and the photography magnification are distant and large respectively, and reducing the degree of correction of the amount of printing exposure when the distance to the subject is distant and the photography magnification is small.

According to a seventh aspect of the present invention, there is provided a photoprinting method of correcting the amount of printing exposure determined based on three R, G and B color density values of a film image to be printed to thereby print the film image on a sheet of printing paper, comprising the following steps of defining in advance a plurality of regions corresponding to subject illuminating light on color coordinates, based on feature amounts of three R, G and B color density values of a number of film images, determining at least one reference average intensity for each of the plurality of regions in advance, measuring a feature amount of three R, G and B color density values of a film image when the film image is printed on the printing paper, determining whether the measured feature amount belongs to any of the plurality of predetermined regions, reading information indicative of an average intensity of the printing film image, which is obtained upon photography, comparing the read average intensity upon the photography and the at least one reference average intensity predefined for each of the plurality of regions and estimating the type of the subject illuminating light from the result of comparison, and varying the degree of correction of the amount of printing exposure according to the estimated type of subject illuminating light, and increasing the degree of correction of the amount of printing exposure based on information indicative of a distance to a subject and a photography magnification when the distance to the subject is near and the photography magnification is large, setting the degree of correction of the amount of printing exposure to the medium when the distance to the subject and the photography magnification are near and small respectively and when the distance to the subject and the photography magnification are distant and large respectively, and reducing the degree of correction of the amount of printing exposure when the distance to the subject is distant and the photography magnification is small.

In the first aspect of the present invention, the type of the subject illuminating light is estimated based on the information indicative of the average intensity obtained upon photography and the information indicative of the presence or absence of the flashes of light. If the information indicative of the presence or absence of the flashes of light shows the presence of the flashes of light, then a photographing source can be estimated as the flashes of light using a stroboscope.

If this information represents the absence of the flashes of light, then the type of the photographing source, i.e., the type of the subject illuminating light can be estimated from the information indicative of the on-photography average intensity.

Next, the amount of printing exposure is determined according to the estimated type of subject illuminating light so that the film images are printed on the printing paper.

In the second aspect of the present invention, the plurality of regions corresponding to the subject illuminating light are defined in advance on the color coordinates, based on the feature amounts of the three R, G and B color density values of a number of film images. As the color coordinates, those such as color coordinates with R–G and G–B as the axes of abscissa and ordinate, color coordinates with R–G and G as the axes of abscissa and ordinate, color coordinates with G–B and G as the axes of abscissa and ordinate, color coordinates with R/G and (R+G+B)/3 as the axes of abscissa and ordinate, and color coordinates with G/B and (R+G+B)/3 as the axes of abscissa and ordinate, can be used. As feature amounts of three R, G and B color density values when these color coordinates are used, differences R–G and G–B in color between respective average density values of three R, G and B colors, differences R–G in color between the average density values and an average density value of G, differences G–B in color between the average density values and an average density value of G, a color ratio R/G between respective average density values of R and G and an average density value (R+G+B)/3 of three R, G and B colors, and a color ratio G/B between respective average density values of G and B and an average density value (R+G+B)/3 of three R, G and B colors are respectively used in order.

It is next determined whether the feature amount of the three R, G and B color density values of the film image to be printed belongs to any of the plurality of regions defined on the color coordinates. As a result, the type of the subject illuminating light can roughly be estimated from the color balance of the film images. As the plurality of regions, a fluorescent-lamp light region in which fluorescent-lamp light is included as the subject illuminating light and a tungsten light region in which tungsten light is included as the subject illuminating light, can be used. However, other regions may be provided in addition thereto.

Further, the amount of printing exposure is determined according to the estimated type of subject illuminating light so as to print the film images on the printing paper.

In the third aspect of the present invention, the plurality of regions corresponding to the subject illuminating light are defined in advance on the color coordinates, based on the feature amounts of the three R, G and B color density values of a number of film images. As the color coordinates, those such as color coordinates with R–G and G–B as the axes of abscissa and ordinate, color coordinates with R–G and G as the axes of abscissa and ordinate, color coordinates with G–B and G as the axes of abscissa and ordinate, color coordinates with R/G and (R+G+B)/3 as the axes of abscissa and ordinate, and color coordinates with G/B and (R+G+B)/3 as the axes of abscissa and ordinate, can be used. As feature amounts of three R, a and B color density values when these color coordinates are used, differences R–G and G–B in color between respective average density values of three R, G and B colors, differences R–G in color between the average density values and an average density value of G, differences G–B in color between the average density values and an average density value of G, a color ratio R/G between respective average density values of R and G and an average density value (R+G+B)/3 of three R, G and B colors, and a color ratio G/B between respective average density values of G and B and an average density value (R+G+B)/3 of three R, a and B colors are respectively used in order.

It is next determined whether the feature amount of the three R, G and B color density values of the film images to be printed belongs to any of the plurality of regions defined on the color coordinates. As a result, the type of the subject illuminating light can roughly be estimated from the color balance of the film images. As the plurality of regions, a fluorescent-lamp light region in which fluorescent-lamp light is included as the subject illuminating light and a tungsten light region in which tungsten light is included as the subject illuminating light, can be used. However, other regions may be provided in addition thereto.

Next, the average intensity of the printing film image, which is obtained upon photography is compared with the at least one reference average intensity predefined for each of the plurality of regions to thereby estimate the type of the subject illuminating light from the result of comparison. Now, consider that a first predetermined value (e.g., −1.5 [EV]) and a second predetermined value (e.g., 3 [EV]) are defined as the at least one reference average intensity in the fluorescent-lamp light region. When the average intensity BV obtained upon photography is less than or equal to the first predetermined value in this condition, the subject illuminating light can be estimated as a scene in which a night view or fireworks has been photographed. When the first predetermined value≦BV≦the second predetermined value, the subject illuminating light can be estimated as the fluorescent-lamp light. Further, when the second predetermined value<BV, the subject illuminating light can be estimated as daylight. Now, consider that a third predetermined value (e.g., 3 [EV]) and a fourth predetermined value (e.g., 6 [EV]) are defined as the at least one reference average intensity in the tungsten light region. When the average intensity BV obtained upon photography is less than or equal to the third predetermined value in this condition, the subject illuminating light can be estimated as the tungsten light. When the third predetermined value<BV≦the fourth predetermined value, the subject illuminating light can be estimated as light obtained by mixing the tungsten light used as the principal part with light emitted from other light source. Further, when the fourth predetermined value<BV, the subject illuminating light can be estimated as daylight low in color temperature or an object color.

Further, the amount of printing exposure is determined according to the estimated type of subject illuminating light so that the film images are printed on the printing paper.

In the photoprinting method of correcting the amount of printing exposure determined based on the three R, G and B color density values of the film image to be printed to thereby print the film image on the printing paper, according to a further aspect of the present invention, the type of the subject illuminating light is estimated based on the information indicative of the average intensity obtained upon photography and the information indicative of the presence or absence of the flashes of light. The degree of correction of the amount of printing exposure is varied according to the estimated type of subject illuminating light. When the subject illuminating light is of fluorescent-lamp light, for example, the degree of correction of the amount of printing exposure is increased. When the subject illuminating light is of light low in color temperature, such as the tungsten light and it is desired to reflect a tint or tone of the subject illuminating light in a print, the degree of correction of the amount of printing exposure is lowered or the amount of printing exposure is non-corrected. When the photography is taken under light high in color temperature as in the case of an overcast sky, the degree of correction of the amount of printing exposure is raised to make a finish print satisfactory.

Since the subject is photographed on a large scale when the distance to the subject is near and the photography magnification is large, the degree of correction of the amount of printings exposure is made greater based on the information indicative of the distance to the subject and the photography magnification. Since the size of the subject is medium when the distance to the subject and the photography magnification are near and small respectively and the distance to the subject and the photography magnification are distant and large respectively, the degree of correction of the amount of printing exposure is set to the medium. Since the subject is reduced in size when the distance to the subject is distant and the photography magnification is small, the degree of correction of the amount of printing exposure is reduced.

Thus, since the information indicative of the distance to the subject and the photography magnification is used as well as the information indicative of the average intensity obtained upon photography and the information indicative of the presence or absence of the flashes of light, a print which is higher in quality, can be created.

In the photoprinting method of correcting the amount of printing exposure determined based on the three R, G and B color density values of the film image to be printed to thereby print the film image on the printing paper, according to a still further aspect of the present invention, the plurality of regions corresponding to the subject illuminating light are defined on the color coordinates based on the feature amounts of the three R, G and B color density values of a number of film images. It is next determined whether the feature amount of the three R, G and B color density values of the film image to printed belongs to any of the plurality of regions. Further, the average intensity of the film image to be printed, which is obtained upon photography, is compared with the at least one reference average intensity predefined for each region to thereby estimate the type of the subject illuminating light. Furthermore, the degree of correction of the amount of printing exposure is varied according to the estimated type of subject illuminating light. When the distance to the subject is near and the photography magnification is large, the degree of correction of the amount of printing exposure is increased based on the information indicative of the distance to the subject and the photography magnification. On the other hand, when the distance to the subject and the photography magnification are near and small respectively and the distance to the subject and the photography magnification are distant and large respectively, the degree of correction of the amount of printing exposure is set to the medium. Further, when the distance to the subject is distant and the photography magnification is small, the degree of correction of the amount of printing exposure is reduced.

Thus, the type of the photographing light source can be estimated with satisfactory accuracy and a print high in quality can be produced.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
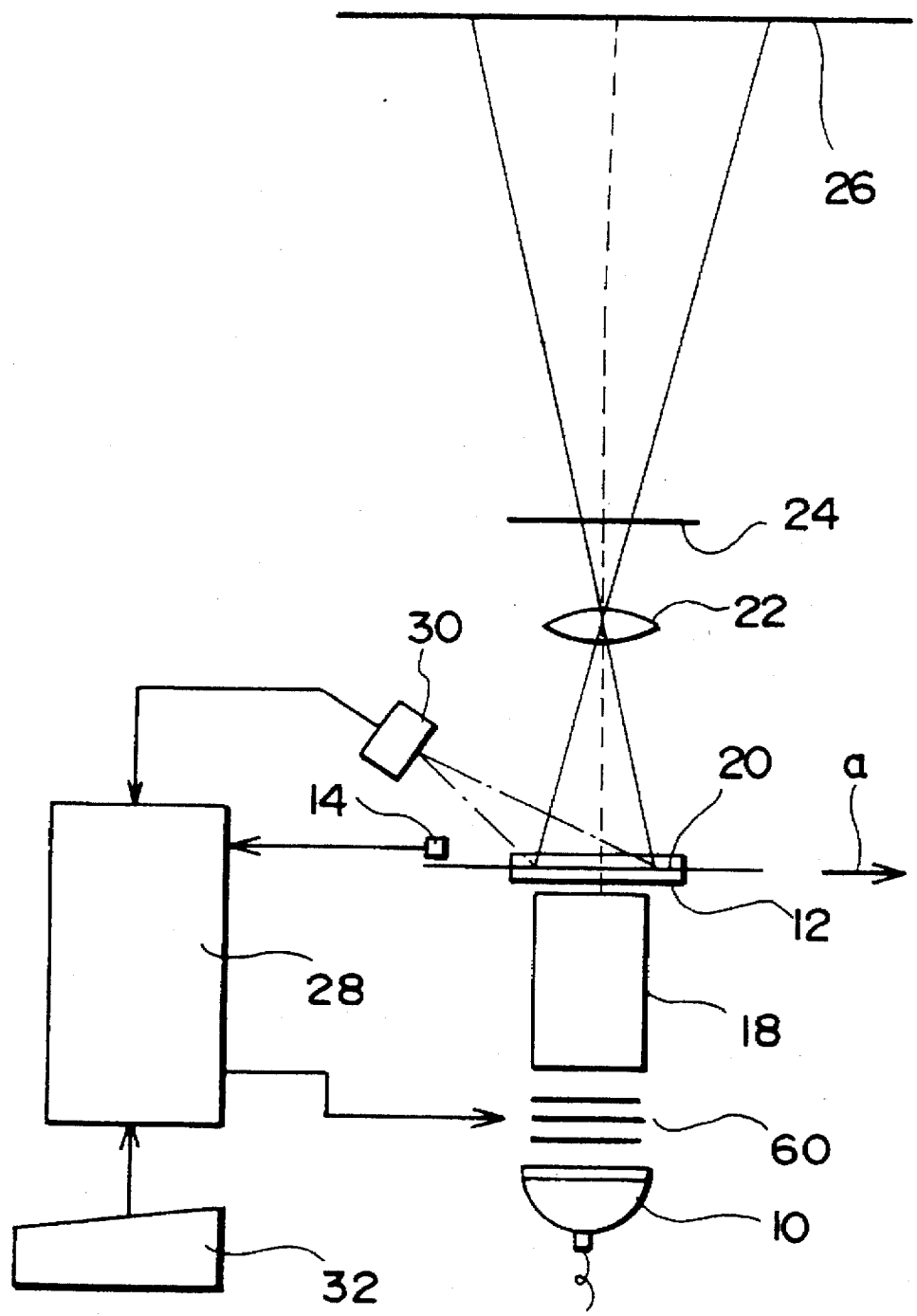
FIG. 1 is a schematic view showing a color photography automatic printer to which the present invention can be applied.

Preferred embodiments of the present invention will hereinafter be described in detail with reference to the accompanying drawings. The present embodiment shows a color photographic printer to which the present invention is applied. As shown in FIG. 1, a lamp house 10 provided with a halogen lamp and a mirror box 18 is disposed below a negative carrier 12 for carrying a negative film 20 to a printing unit. A dimming filter (a light adjusting filter) 60 is disposed between the mirror box 18 and the lamp house 10. The dimming filter 60 comprises three color filters of a Y (Yellow) filter, an M (magenta) filter and a C (Cyan) filter as is commonly known.

A lens 22, a black shutter 24 and a sheet of color paper 26 are disposed above the negative carrier 12 in order. Light emitted from the lamp house 10 and transmitted through the dimming filter 60, the mirror box 18 and the negative film 20 is focused on the color paper 26 by the lens 22.

A two-dimensional image sensor 30, which divides a negative image into a large number of parts and measures light for each of the three colors of R, G and B, is situated in the direction of being inclined to an optical axis of the above focusing optical system and in a position where it can measure the density of an image on the negative film 20.

Figure 2:
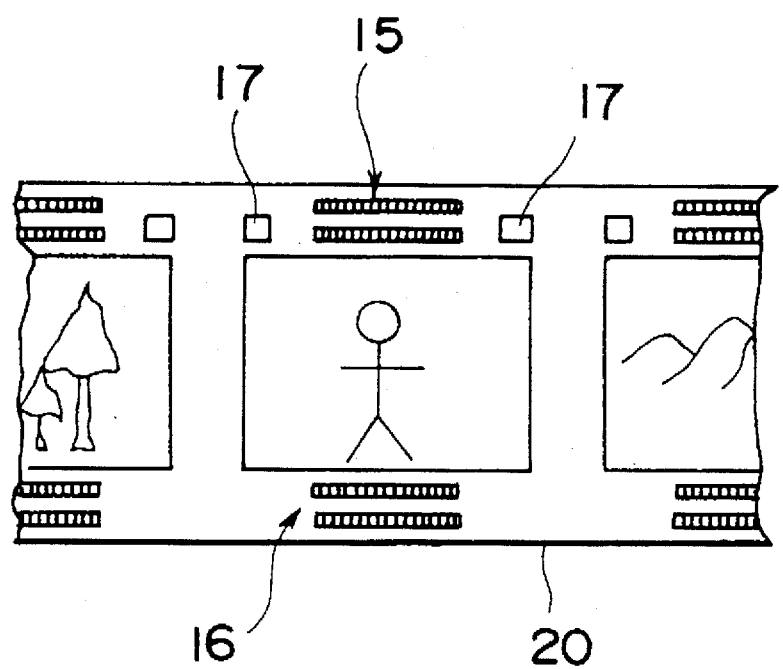
FIG. 2 is a plan view showing a film.

A transparent magnetic layer is applied over the entire surface of the negative film 20, which is opposite to the surface of a photographic emulsion. As shown in FIG. 2, information indicative of an average intensity or brightness BV obtained upon photography and information indicative of the presence or absence of flashes of light have been recorded on a magnetic track 16 provided so as to correspond to an image frame. The average brightness BV upon photography is detected by a sensor such as a silicon photodiode, a photo detector or the like mounted on a camera and is magnetically recorded by a magnetic head mounted to the camera. The information indicative of the presence of the flashes of light is magnetically recorded in the form of sign or symbol by the magnetic head mounted to the camera upon photography using an electronic flash or a stroboscope.

The average brightness BV upon photography is divided into four steps as represented in Table 1 shown below and is recorded in the form of the sign or symbol corresponding to each division. In FIG. 2, reference numeral 15 indicates magnetic tracks employed in a laboratory and reference numeral 17 indicates perforations respectively defined in positions corresponding to edges of respective frames.

TABLE 1

| Average brightness | Symbols |
| --- | --- |
| BV ≦ −1.5 [EV] | 00 |
| −1.5 [EV] < BV ≦ 3 [EV] | 10 |
| 3 [EV] < BV ≦ 6 [EV] | 01 |
| 6 < BV [EV] | 11 |

The average brightness BV upon photography may be divided into parts finer than the above parts and may be recorded in the form of a numerical value or the like indicative of the average brightness BV. However, the recording capacity can be reduced by recording the average brightness BV in either sign or symbol. Although the information indicative of the average brightness BV obtained upon photography and the information indicative of the presence or absence of the flashes of light have been magnetically recorded in FIG. 2, they may optically be recorded by using barcodes or optical marks. Further, the position where each information is to be recorded on a film is not necessarily limited to that shown in FIG. 2. The information may be recorded between film image frames or in an IC applied or printed to a film or a film storing cartridge, for example. Although the transparent magnetic layer has been formed over the entire surface of the negative film 20 in the above description, either a transparent magnetic layer or a non-transparent magnetic layer may be formed only in a position adjacent to a side edge of the film and along the longitudinal direction of the film.

A magnetic head 14 for scanning or reading the information recorded on the magnetic tracks 15 is provided on the upstream side of the negative carrier 12 and at a position where magnetic information recorded on the film can be read. Incidentally, an optical reader is used when the information is optically recorded. The magnetic head 14 and the two-dimensional image sensor 30 are electrically connected to a control circuit 28 comprised of a microcomputer, an electric circuit, etc. A keyboard 32 for inputting data or the like is electrically connected to the control circuit 28. The control circuit 28 is connected to the dimming filter (light adjusting filter) 60 so as to control the dimming filter 60.

Figure 3:
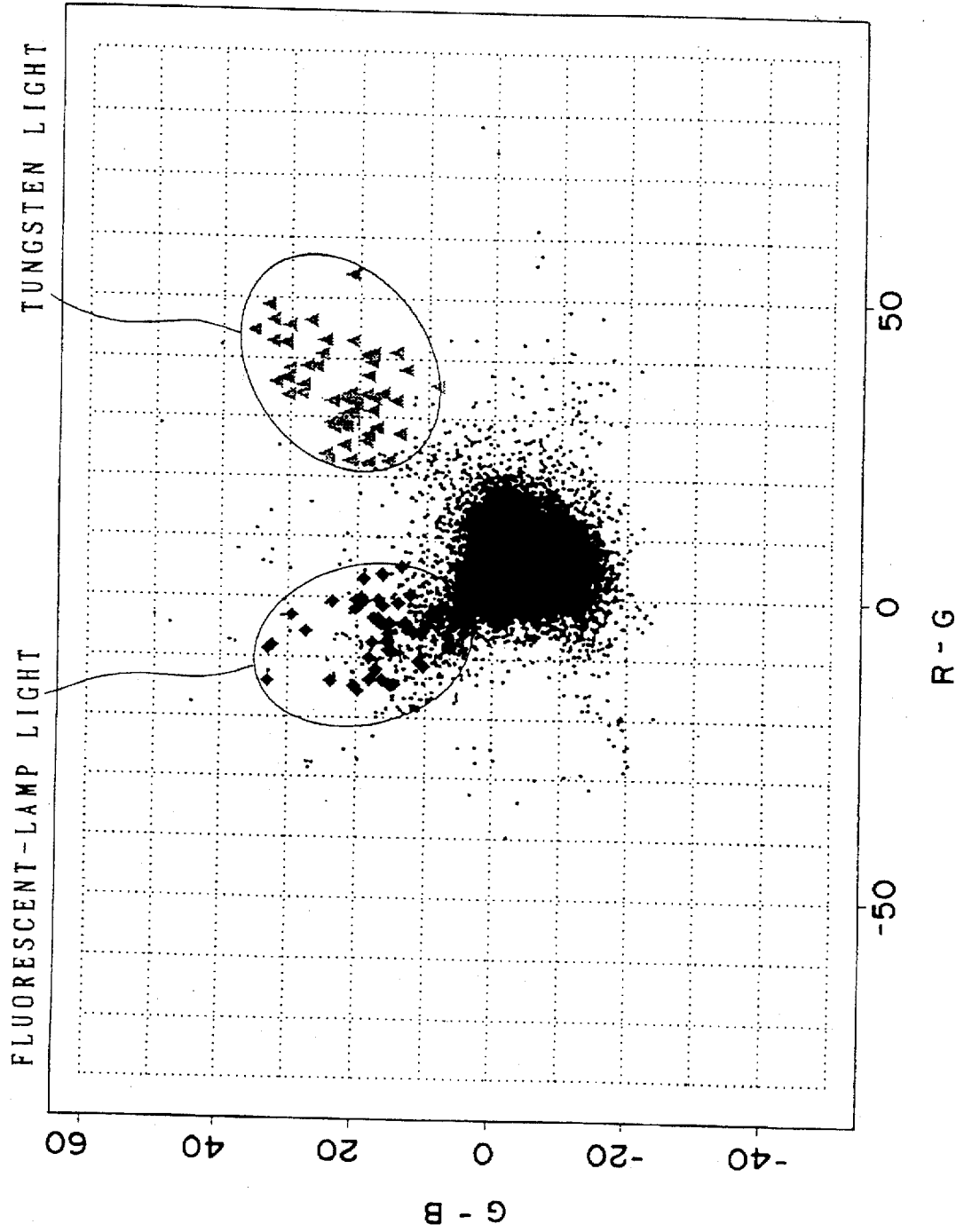
FIG. 3 is a diagram showing a light region of a fluorescent lamp and a light region of a tungsten, both of which are defined on color coordinates.

Next, a region of light emitted from a fluorescent lamp and a region of light of a tungsten, as a plurality of regions corresponding to subject illuminating light employed in the present embodiment, will be described below. First of all, using 5423 frames of a sample negative having photographed information recorded thereon, RGB densities for each frame are measured and an average value for each of the RGB densities is calculated. The result obtained by plotting R–G and G–B calculated from the average values on color coordinates with R–G and G–B as the axis of abscissas and the axis of ordinates respectively will be shown in FIG. 3. Incidentally, the axes of abscissas and ordinates R–G and G–B are respectively set as 100 times the RGB density. In FIG. 3, each of triangles indicates a frame in which the subject illuminating light is tungsten light. Each of quadrangles indicates a frame in which the subject illuminating light is fluorescent-lamp light. Further, black points indicate frames corresponding to the other subject illuminating lights. An elliptic region of fluorescent-lamp light including fluorescent-lamp light as the subject illuminating light and an elliptic region of tungsten light including tungsten light as the subject illuminating light are defined on the color coordinates as represented in Table 2 shown below.

TABLE 2

| Color balance region | Position of center | Radius A | Radius B | Angle of rotation |
|---|---|---|---|---|
| Region of fluorescent-lamp light | (−8.0, 19.0) | 13.0 | 16.5 | 23° |
| Region of tungsten light | (39.0, 23.0) | 19.0 | 13.5 | 25° |

In Table 2, the position of center corresponds to the position of center of an ellipse, the radius A of the fluorescent-lamp light region is equal to half the minor axis of the ellipse, the radius B thereof is equal to half the major axis of the ellipse, the radius A of the tungsten light region is equal to half the major axis of the ellipse, the radius B thereof is equal to half the minor axis thereof, and the angle of rotation is equal to an angle formed by rotating the major axis of each ellipse in a counterclockwise direction with the center of the ellipse as reference.

The shape of each of both the fluorescent-lamp light region and the tungsten light region is not necessarily limited to the ellipse. If a region, which includes frames in which the subject illuminating light is fluorescent-lamp light and which minimizes the number of frames in which the subject illuminating light is other than the fluorescent-lamp light and a region, which includes frames in which the subject illuminating light is tungsten light and which minimizes the number of frames in which the subject illuminating light is other than the tungsten light, are used, these regions may be of any shape.

As a result of investigation of the magnitude of the average brightness BV with respect to each of frames respectively included in the regions of the fluorescent-lamp light and the tungsten light, there were found five frames in which the color balance belonged to the fluorescent-lamp light region and in which the average brightness BV was less than or equal to −1.5. A night view and fireworks other than the fluorescent lamp were used as photographing sources (subject illuminating light) for those five frames as shown in Table 3 below.

TABLE 3

| Average brightness | R – G | G – B | Photographing source |
|---|---|---|---|
| −2.250 | −6.47 | 4.70 | night view |
| −2.750 | −2.12 | 4.84 | fireworks |
| −3.625 | −9.74 | 4.41 | night view |
| −2.625 | −3.52 | 7.73 | fireworks |
| −3.125 | −8.91 | 7.35 | fireworks |

Further, 56 frames were found in which the color balance belonged to the fluorescent-lamp light region and in which the average brightness BV was −1.5 [EV]<BV≦3.0 [EV]. The photographing sources include fluorescent lamps of 53 frames and daylights of 3 frames as presented in Table 4 shown below.

TABLE 4

| Average brightness | R – G | G – B | Photographing source |
|---|---|---|---|
| 1.000 | −8.02 | 32.30 | fluorescent lamp |
| 0.750 | −3.07 | 29.51 | fluorescent lamp |
| 1.250 | −8.60 | 32.97 | fluorescent lamp |
| 1.375 | −5.74 | 27.34 | fluorescent lamp |
| 3.000 | −4.56 | 5.85 | fluorescent lamp |
| 2.125 | −15.64 | 9.10 | daylight |
| 1.875 | −18.11 | 11.16 | daylight |
| 2.250 | −16.75 | 10.77 | daylight |
| 2.625 | −3.00 | 5.61 | fluorescent lamp |
| 0.250 | −3.49 | 17.53 | fluorescent lamp |
| 0.000 | −0.65 | 19.06 | fluorescent lamp |
| 0.000 | −1.41 | 16.24 | fluorescent lamp |
| 2.375 | −0.04 | 19.36 | fluorescent lamp |
| 0.375 | −7.50 | 17.76 | fluorescent lamp |
| 1.500 | −0.69 | 5.01 | fluorescent lamp |
| 2.875 | −10.56 | 10.97 | fluorescent lamp |
| 1.875 | −14.35 | 14.57 | fluorescent lamp |
| 2.125 | −11.40 | 10.34 | fluorescent lamp |
| 0.625 | −5.34 | 4.22 | fluorescent lamp |

TABLE 4-continued

| Average brightness | R − G | G − B | Photographing source |
|---|---|---|---|
| 0.250 | −8.97 | 14.85 | fluorescent lamp |
| −0.500 | −1.96 | 20.15 | fluorescent lamp |
| 0.000 | 3.05 | 19.08 | fluorescent lamp |
| 2.000 | −11.83 | 17.25 | fluorescent lamp |
| 0.875 | −14.66 | 20.37 | fluorescent lamp |
| 0.875 | −2.84 | 9.53 | fluorescent lamp |
| 0.125 | −7.58 | 15.46 | fluorescent lamp |
| 0.625 | −4.47 | 16.41 | fluorescent lamp |
| 0.625 | −1.40 | 7.61 | fluorescent lamp |
| 0.750 | −2.13 | 7.75 | fluorescent lamp |
| 0.750 | 5.11 | 13.53 | fluorescent lamp |
| 0.500 | 0.51 | 12.25 | fluorescent lamp |
| 0.750 | −4.29 | 12.98 | fluorescent lamp |
| 1.375 | −10.03 | 18.13 | fluorescent lamp |
| 1.250 | −11.99 | 17.24 | fluorescent lamp |
| 1.250 | 3.72 | 16.20 | fluorescent lamp |
| 1.125 | 3.93 | 16.36 | fluorescent lamp |
| 0.250 | −0.40 | 16.91 | fluorescent lamp |
| −0.750 | −0.49 | 20.07 | fluorescent lamp |
| 0.125 | −4.24 | 15.23 | fluorescent lamp |
| 2.000 | −0.91 | 14.03 | fluorescent lamp |
| 1.625 | −8.33 | 6.42 | fluorescent lamp |
| 1.625 | −4.04 | 3.73 | fluorescent lamp |
| −0.375 | −0.71 | 23.51 | fluorescent lamp |
| 1.750 | −14.29 | 15.27 | fluorescent lamp |
| 0.250 | −13.62 | 16.25 | fluorescent lamp |
| 0.250 | −13.66 | 18.12 | fluorescent lamp |
| −1.250 | −13.93 | 33.02 | fluorescent lamp |
| 0.125 | −4.58 | 15.46 | fluorescent lamp |
| 1.375 | −13.88 | 23.73 | fluorescent lamp |
| 1.125 | −15.50 | 19.79 | fluorescent lamp |
| −0.375 | −4.62 | 9.83 | fluorescent lamp |
| 0.625 | −6.03 | 15.42 | fluorescent lamp |
| 0.500 | −7.06 | 15.46 | fluorescent lamp |
| −0.500 | −3.53 | 16.93 | fluorescent lamp |
| 2.375 | −5.92 | 10.70 | fluorescent lamp |
| 2.000 | −4.94 | 12.55 | fluorescent lamp |

Further, 317 frames exist in which the color balance belongs to the fluorescent-lamp light region and in which the average brightness BV is 3.0 [EV]≦BV. The photographing sources include daylights of 316 frames and a fluorescent lamp of one frame as represented in Table 5 shown below.

TABLE 5

| Average brightness | R − G | G − B | Photographing source |
|---|---|---|---|
| 7.625 | −8.06 | 19.22 | daylight |
| 6.750 | 1.19 | 8.41 | daylight |
| 6.250 | −1.67 | 4.20 | daylight |
| 8.875 | −4.61 | 4.80 | daylight |
| 8.625 | −4.24 | 14.17 | daylight |
| 8.375 | −8.03 | 12.58 | daylight |
| 6.750 | −9.25 | 4.15 | daylight |
| 8.375 | −5.53 | 12.62 | daylight |
| 8.250 | −7.39 | 19.49 | daylight |
| 8.500 | −1.08 | 4.68 | daylight |
| 8.375 | −1.55 | 4.84 | daylight |
| 8.250 | −2.31 | 10.88 | daylight |
| 8.750 | −8.34 | 11.16 | daylight |
| 8.000 | −9.52 | 13.86 | daylight |
| 4.750 | −7.80 | 5.78 | daylight |
| 5.125 | −6.53 | 6.12 | daylight |
| 8.750 | −3.34 | 7.73 | daylight |
| 7.375 | 1.88 | 10.37 | daylight |
| 7.000 | 0.24 | 6.53 | daylight |
| 7.250 | −1.98 | 5.06 | daylight |
| 8.250 | −3.02 | 10.39 | daylight |
| 8.250 | −3.01 | 11.63 | daylight |
| 9.000 | −3.21 | 30.92 | daylight |
| 8.500 | −2.69 | 20.97 | daylight |

TABLE 5-continued

| Average brightness | R − G | G − B | Photographing source |
|---|---|---|---|
| 3.125 | −12.91 | 7.94 | daylight |
| 3.125 | −13.02 | 7.65 | daylight |
| 3.125 | −12.78 | 7.55 | daylight |
| 9.625 | −4.51 | 13.71 | daylight |
| 9.250 | −6.22 | 6.22 | daylight |
| 8.125 | 0.97 | 6.72 | daylight |
| 8.875 | 0.59 | 21.21 | daylight |
| 7.250 | −6.25 | 12.09 | daylight |
| 7.000 | −4.84 | 13.28 | daylight |
| 6.750 | −8.09 | 6.25 | daylight |
| 7.625 | 0.48 | 7.18 | daylight |
| 8.750 | −1.09 | 24.44 | daylight |
| 6.375 | −10.89 | 21.50 | daylight |
| 8.375 | −5.50 | 14.48 | daylight |
| 8.625 | 3.54 | 9.17 | daylight |
| 7.500 | −4.65 | 15.89 | daylight |
| 8.250 | 1.10 | 9.38 | daylight |
| 5.625 | −1.45 | 11.71 | daylight |
| 7.500 | 2.15 | 13.92 | daylight |
| 8.250 | −5.90 | 29.74 | daylight |
| 8.375 | −2.42 | 4.38 | daylight |
| 7.500 | −4.09 | 5.86 | daylight |
| 7.750 | −1.27 | 5.36 | daylight |
| 7.375 | −2.42 | 12.46 | daylight |
| 8.500 | −5.21 | 6.79 | daylight |
| 8.750 | 0.92 | 9.79 | daylight |
| 7.875 | −8.39 | 19.39 | daylight |
| 9.000 | 3.51 | 11.96 | daylight |
| 8.875 | 2.79 | 10.08 | daylight |
| 8.375 | −1.13 | 7.06 | daylight |
| 9.125 | 0.36 | 11.49 | daylight |
| 7.500 | −2.03 | 8.53 | daylight |
| 7.750 | −3.12 | 17.37 | daylight |
| 6.625 | 2.31 | 6.93 | daylight |
| 7.750 | −6.71 | 11.88 | daylight |
| 7.500 | −2.56 | 10.09 | daylight |
| 7.375 | −3.95 | 12.51 | daylight |
| 7.625 | −4.91 | 7.63 | daylight |
| 8.375 | −0.51 | 30.66 | daylight |
| 8.375 | −7.09 | 9.19 | daylight |
| 8.250 | 0.60 | 13.08 | daylight |
| 6.000 | −6.16 | 11.38 | daylight |
| 3.750 | −2.26 | 12.38 | daylight |
| 3.875 | −14.09 | 18.15 | daylight |
| 6.375 | −13.20 | 23.17 | daylight |
| 5.375 | −9.56 | 9.35 | daylight |
| 8.125 | −1.30 | 10.96 | daylight |
| 7.375 | −9.58 | 10.30 | daylight |
| 4.625 | −17.87 | 11.72 | daylight |
| 7.250 | −2.38 | 6.34 | daylight |
| 6.000 | −9.83 | 12.99 | daylight |
| 5.750 | −10.38 | 7.07 | daylight |
| 8.375 | 0.54 | 14.61 | daylight |
| 8.000 | −1.04 | 12.34 | daylight |
| 4.250 | −6.90 | 15.50 | daylight |
| 7.625 | −9.35 | 9.96 | daylight |
| 7.250 | −6.31 | 7.43 | daylight |
| 6.500 | −6.95 | 8.55 | daylight |
| 7.625 | −2.01 | 9.01 | daylight |
| 7.625 | −1.92 | 4.03 | daylight |
| 8.250 | −4.52 | 5.14 | daylight |
| 7.125 | −11.30 | 7.93 | daylight |
| 8.500 | −12.18 | 14.24 | daylight |
| 5.750 | −3.49 | 4.50 | daylight |
| 5.250 | −2.06 | 6.05 | daylight |
| 5.250 | −5.40 | 8.53 | daylight |
| 5.750 | −5.14 | 8.71 | daylight |
| 6.125 | −3.69 | 8.56 | daylight |
| 5.875 | −6.14 | 12.27 | daylight |
| 7.625 | −4.84 | 4.38 | daylight |
| 7.000 | −1.92 | 6.58 | daylight |
| 6.875 | −6.01 | 8.06 | daylight |
| 7.375 | 1.41 | 6.88 | daylight |
| 9.500 | −5.48 | 6.54 | daylight |
| 8.875 | 0.58 | 5.67 | daylight |
| 6.125 | −5.79 | 11.83 | daylight |

TABLE 5-continued

| Average brightness | R − G | G − B | Photographing source |
|---|---|---|---|
| 8.500 | −6.48 | 6.81 | daylight |
| 9.000 | −6.28 | 22.89 | daylight |
| 9.000 | −6.11 | 22.03 | daylight |
| 8.125 | −10.49 | 24.19 | daylight |
| 7.750 | 4.07 | 16.33 | daylight |
| 7.625 | −5.63 | 9.90 | daylight |
| 6.125 | −5.23 | 4.14 | daylight |
| 6.250 | −8.63 | 4.85 | daylight |
| 6.750 | −7.21 | 6.58 | daylight |
| 7.625 | −1.49 | 11.52 | daylight |
| 7.875 | 1.81 | 7.33 | daylight |
| 7.125 | −0.69 | 7.08 | daylight |
| 9.500 | −3.22 | 8.69 | daylight |
| 9.750 | −5.83 | 14.34 | daylight |
| 10.125 | −3.82 | 11.43 | daylight |
| 8.500 | −8.74 | 17.99 | daylight |
| 8.875 | −9.14 | 15.85 | daylight |
| 9.375 | −5.53 | 15.76 | daylight |
| 8.750 | −6.95 | 10.70 | daylight |
| 9.000 | 0.46 | 6.12 | daylight |
| 9.375 | −0.06 | 6.35 | daylight |
| 9.500 | 2.50 | 9.72 | daylight |
| 9.750 | 1.82 | 6.73 | daylight |
| 8.125 | 0.02 | 14.91 | daylight |
| 5.625 | −13.31 | 11.75 | daylight |
| 6.750 | −9.17 | 13.36 | daylight |
| 6.375 | −11.21 | 17.40 | daylight |
| 8.000 | −13.02 | 12.86 | daylight |
| 5.500 | 3.88 | 15.10 | daylight |
| 5.500 | −4.44 | 10.75 | daylight |
| 9.000 | −3.47 | 5.95 | daylight |
| 9.250 | −3.80 | 5.90 | daylight |
| 9.125 | −5.77 | 7.40 | daylight |
| 8.750 | −4.73 | 3.82 | daylight |
| 7.625 | −11.85 | 13.16 | daylight |
| 9.000 | −5.34 | 11.74 | daylight |
| 8.625 | −10.61 | 18.25 | daylight |
| 9.875 | 3.23 | 8.68 | daylight |
| 9.750 | 1.84 | 14.01 | daylight |
| 8.625 | −10.12 | 16.67 | daylight |
| 9.000 | −6.87 | 16.02 | daylight |
| 9.375 | −8.00 | 17.62 | daylight |
| 9.750 | −6.59 | 19.92 | daylight |
| 9.750 | −4.85 | 20.01 | daylight |
| 9.250 | 20.39 | 10.63 | daylight |
| 10.000 | 4.00 | 11.73 | daylight |
| 9.750 | −7.11 | 23.13 | daylight |
| 9.375 | −6.99 | 20.99 | daylight |
| 8.375 | −9.15 | 15.06 | daylight |
| 7.875 | −14.22 | 14.15 | daylight |
| 8.000 | −13.75 | 14.06 | daylight |
| 9.250 | −3.74 | 15.05 | daylight |
| 9.000 | −5.55 | 13.28 | daylight |
| 9.000 | −4.36 | 14.20 | daylight |
| 7.875 | −9.63 | 8.51 | daylight |
| 8.375 | −12.01 | 17.02 | daylight |
| 8.750 | −10.67 | 8.58 | daylight |
| 8.125 | −6.41 | 21.55 | daylight |
| 9.000 | 1.16 | 11.85 | daylight |
| 5.750 | −2.32 | 6.99 | daylight |
| 8.625 | −8.63 | 12.10 | daylight |
| 9.250 | −7.95 | 10.73 | daylight |
| 9.500 | −6.34 | 8.92 | daylight |
| 8.875 | −9.95 | 7.91 | daylight |
| 9.125 | −6.00 | 11.86 | daylight |
| 8.875 | −3.47 | 9.73 | daylight |
| 8.750 | −2.33 | 12.16 | daylight |
| 8.375 | 1.72 | 8.49 | daylight |
| 8.000 | −5.31 | 8.24 | daylight |
| 8.500 | −2.94 | 6.26 | daylight |
| 8.750 | −5.96 | 12.90 | daylight |
| 9.250 | −0.27 | 8.19 | daylight |
| 7.125 | −3.89 | 8.25 | daylight |
| 7.000 | −3.80 | 7.51 | daylight |
| 6.000 | 0.48 | 6.37 | daylight |
| 8.875 | −5.15 | 6.20 | daylight |
| 4.250 | −7.69 | 4.63 | daylight |
| 5.250 | −10.73 | 9.05 | daylight |
| 5.500 | −8.63 | 7.44 | daylight |
| 5.500 | −11.38 | 10.43 | daylight |
| 5.375 | −13.61 | 12.88 | daylight |
| 7.250 | −8.61 | 4.68 | daylight |
| 6.375 | −1.53 | 8.51 | daylight |
| 8.625 | −6.27 | 11.70 | daylight |
| 9.125 | −10.52 | 13.62 | daylight |
| 9.625 | −11.38 | 14.33 | daylight |
| 8.875 | −1.16 | 12.19 | daylight |
| 8.750 | −2.44 | 11.42 | daylight |
| 8.125 | −4.75 | 13.78 | daylight |
| 9.125 | −2.10 | 8.34 | daylight |
| 9.250 | −1.24 | 6.92 | daylight |
| 9.000 | −7.72 | 15.54 | daylight |
| 8.750 | −8.70 | 16.19 | daylight |
| 9.500 | −1.59 | 6.20 | daylight |
| 4.000 | −11.48 | 4.84 | daylight |
| 4.000 | −14.39 | 10.25 | daylight |
| 4.000 | −9.07 | 4.11 | daylight |
| 4.500 | −18.62 | 13.63 | daylight |
| 4.250 | −18.57 | 11.91 | daylight |
| 4.375 | −14.13 | 10.39 | daylight |
| 4.875 | −15.80 | 11.48 | daylight |
| 5.250 | −9.28 | 5.13 | daylight |
| 5.250 | −7.60 | 5.51 | daylight |
| 5.000 | −10.69 | 5.72 | daylight |
| 5.000 | −10.92 | 5.69 | daylight |
| 4.750 | −12.44 | 8.00 | daylight |
| 4.250 | −16.83 | 9.74 | daylight |
| 4.875 | −11.00 | 6.51 | daylight |
| 5.750 | −9.27 | 4.29 | daylight |
| 5.250 | −14.11 | 11.39 | daylight |
| 4.000 | −19.23 | 16.12 | daylight |
| 4.250 | −19.22 | 13.12 | daylight |
| 5.250 | −18.15 | 13.99 | daylight |
| 4.875 | −19.98 | 17.10 | daylight |
| 4.375 | −16.56 | 9.13 | daylight |
| 5.125 | −18.47 | 15.64 | daylight |
| 5.125 | −16.64 | 12.02 | daylight |
| 4.625 | −14.05 | 7.84 | daylight |
| 5.000 | −16.66 | 13.11 | daylight |
| 5.000 | −16.38 | 14.84 | daylight |
| 4.625 | −9.02 | 7.24 | daylight |
| 4.750 | −5.66 | 4.81 | daylight |
| 4.500 | −8.41 | 6.16 | daylight |
| 4.500 | −7.74 | 5.03 | daylight |
| 4.625 | −9.04 | 4.45 | daylight |
| 4.125 | −11.11 | 8.45 | daylight |
| 4.250 | −11.02 | 8.48 | daylight |
| 5.125 | −9.69 | 9.42 | daylight |
| 5.000 | −9.28 | 10.11 | daylight |
| 5.250 | −12.20 | 11.47 | daylight |
| 5.375 | −12.88 | 8.24 | daylight |
| 8.875 | −3.34 | 6.87 | daylight |
| 7.750 | −7.13 | 6.18 | daylight |
| 7.625 | −7.91 | 10.82 | daylight |
| 7.500 | −2.55 | 6.76 | daylight |
| 7.375 | −4.39 | 4.84 | daylight |
| 6.500 | −5.41 | 15.55 | daylight |
| 5.250 | −9.21 | 14.82 | daylight |
| 9.750 | −2.66 | 9.47 | daylight |
| 8.625 | −0.02 | 6.66 | daylight |
| 8.375 | −1.52 | 9.42 | daylight |
| 7.875 | −3.77 | 8.73 | daylight |
| 7.750 | −4.75 | 8.15 | daylight |
| 7.750 | −12.34 | 20.56 | daylight |
| 8.250 | −7.19 | 15.31 | daylight |
| 8.375 | 0.87 | 8.48 | daylight |
| 6.375 | −4.59 | 6.32 | daylight |
| 8.375 | −2.34 | 3.84 | daylight |
| 8.625 | −3.21 | 6.59 | daylight |
| 9.625 | −4.78 | 7.55 | daylight |
| 7.750 | −1.83 | 4.32 | daylight |
| 6.750 | −2.56 | 3.89 | daylight |

TABLE 5-continued

| Average brightness | R − G | G − B | Photographing source |
|---|---|---|---|
| 7.500 | −9.45 | 7.85 | daylight |
| 7.375 | −8.91 | 13.72 | daylight |
| 3.125 | −0.24 | 5.78 | daylight |
| 8.125 | −10.34 | 15.19 | daylight |
| 7.375 | −1.77 | 7.00 | daylight |
| 5.250 | −4.08 | 4.91 | daylight |
| 4.000 | −6.94 | 5.28 | daylight |
| 5.750 | −3.98 | 4.00 | daylight |
| 5.625 | −8.22 | 7.52 | daylight |
| 5.875 | −4.87 | 8.87 | daylight |
| 3.375 | −6.65 | 6.71 | daylight |
| 8.000 | 0.79 | 5.66 | daylight |
| 7.500 | −4.20 | 7.59 | daylight |
| 7.500 | −3.18 | 8.27 | daylight |
| 7.375 | −7.78 | 7.42 | daylight |
| 8.375 | −4.97 | 8.17 | daylight |
| 8.250 | −5.16 | 10.02 | daylight |
| 7.750 | −12.44 | 20.50 | daylight |
| 7.625 | −12.66 | 23.24 | daylight |
| 7.625 | −7.56 | 16.66 | daylight |
| 7.625 | −8.11 | 13.77 | daylight |
| 8.000 | −1.07 | 9.29 | daylight |
| 7.750 | −8.93 | 10.84 | daylight |
| 8.125 | −8.47 | 9.25 | daylight |
| 7.625 | −2.15 | 5.76 | daylight |
| 8.500 | −9.44 | 10.84 | daylight |
| 7.500 | −13.86 | 20.81 | daylight |
| 8.250 | 0.83 | 5.34 | daylight |
| 8.625 | −1.36 | 4.41 | daylight |
| 6.750 | 4.43 | 18.95 | daylight |
| 8.500 | −12.36 | 32.87 | daylight |
| 6.750 | −1.44 | 12.46 | daylight |
| 6.250 | −0.44 | 10.12 | daylight |
| 5.875 | −16.94 | 14.78 | daylight |
| 9.500 | −0.77 | 5.20 | daylight |
| 7.500 | −0.81 | 7.26 | daylight |
| 8.500 | −4.05 | 4.03 | daylight |
| 5.000 | −9.52 | 14.48 | daylight |
| 5.500 | −16.30 | 14.72 | daylight |
| 6.875 | −6.12 | 11.59 | daylight |
| 6.125 | −1.49 | 23.66 | daylight |
| 7.875 | −1.55 | 3.89 | daylight |
| 6.250 | −8.27 | 3.97 | daylight |
| 5.625 | −7.67 | 8.70 | daylight |
| 5.000 | −10.51 | 8.69 | daylight |
| 6.625 | −15.30 | 15.03 | daylight |
| 5.500 | −9.12 | 5.79 | daylight |
| 3.500 | −13.08 | 12.29 | daylight |
| 5.250 | −6.35 | 6.77 | daylight |
| 8.500 | −4.84 | 8.03 | daylight |
| 7.000 | −5.08 | 6.63 | daylight |
| 4.250 | −6.27 | 7.12 | daylight |
| 7.125 | −1.75 | 7.81 | daylight |
| 5.375 | −5.37 | 11.22 | daylight |
| 10.000 | −6.53 | 7.39 | daylight |
| 9.625 | −5.06 | 5.66 | daylight |
| 9.625 | 2.18 | 13.52 | daylight |
| 7.375 | −10.40 | 11.55 | daylight |
| 8.625 | −3.83 | 10.56 | daylight |
| 8.625 | 0.73 | 6.09 | daylight |
| 4.875 | −8.57 | 12.44 | daylight |
| 6.375 | −8.07 | 10.67 | daylight |
| 6.000 | −9.50 | 15.57 | daylight |
| 6.375 | −5.85 | 12.22 | daylight |
| 4.500 | −8.22 | 4.43 | daylight |

Thus, the type of the subject illuminating light can be estimated with considerably high accuracy by adopting −1.5 [EV] and 3 [EV] as reference values of the average brightness for the fluorescent-lamp light region.

Next, there were found 39 frames in which the color balance belonged to the tungsten light region and in which the average brightness BV was less than or equal to 3.0 [EV]. All the photographing sources were tungsten light as represented in Table 6 shown below.

TABLE 6

| Average brightness | R − G | G − B | Photographing source |
|---|---|---|---|
| 3.000 | 32.88 | 21.07 | tungsten light |
| 1.750 | 32.21 | 20.44 | tungsten light |
| 1.875 | 22.71 | 15.75 | tungsten light |
| 0.375 | 30.53 | 22.01 | tungsten light |
| 2.750 | 40.75 | 25.48 | tungsten light |
| 2.125 | 22.47 | 18.63 | tungsten light |
| 2.375 | 28.65 | 22.57 | tungsten light |
| 0.750 | 34.01 | 21.37 | tungsten light |
| 1.125 | 44.66 | 35.60 | tungsten light |
| −0.875 | 43.09 | 25.09 | tungsten light |
| 0.125 | 38.66 | 26.30 | tungsten light |
| −0.125 | 33.97 | 16.64 | tungsten light |
| 0.375 | 33.14 | 17.84 | tungsten light |
| 0.250 | 33.80 | 19.06 | tungsten light |
| −0.875 | 42.62 | 30.91 | tungsten light |
| 0.875 | 43.02 | 21.12 | tungsten light |
| 0.250 | 37.05 | 18.79 | tungsten light |
| −0.125 | 48.78 | 33.41 | tungsten light |
| −0.500 | 46.29 | 27.15 | tungsten light |
| −1.750 | 42.85 | 32.79 | tungsten light |
| 0.250 | 39.43 | 18.32 | tungsten light |
| 0.250 | 41.10 | 14.75 | tungsten light |
| 0.125 | 30.82 | 21.07 | tungsten light |
| 0.875 | 40.60 | 19.02 | tungsten light |
| 1.000 | 40.91 | 18.14 | tungsten light |
| 1.375 | 23.80 | 24.85 | tungsten light |
| 1.500 | 22.61 | 24.46 | tungsten light |
| 1.125 | 25.31 | 22.16 | tungsten light |
| 0.750 | 22.74 | 21.23 | tungsten light |
| 0.625 | 35.44 | 28.20 | tungsten light |
| 0.625 | 36.59 | 30.90 | tungsten light |
| 0.500 | 36.60 | 30.53 | tungsten light |
| −0.125 | 27.29 | 14.18 | tungsten light |
| −3.000 | 38.11 | 13.27 | tungsten light |
| −3.375 | 46.35 | 32.70 | tungsten light |
| −2.750 | 45.47 | 30.29 | tungsten light |
| 1.750 | 31.10 | 18.18 | tungsten light |
| 2.500 | 53.95 | 21.19 | tungsten light |
| 0.00 | 26.01 | 18.99 | tungsten light |

Further, 18 frames were found in which the color balance belongs to the tungsten light region and in which the average brightness BV is 3.0 [EV]<BV≦6.0 [EV]. The photographing sources were almost those obtained by combining the tungsten light and other light source as represented in Table 7 shown below.

TABLE 7

| Average brightness | R − G | G − B | Photographing source |
|---|---|---|---|
| 3.750 | 27.13 | 18.72 | tungsten light + outer light |
| 4.750 | 33.09 | 22.21 | tungsten light + a plurality of light sources |
| 4.125 | 29.09 | 24.09 | tungsten light + a plurality of light sources |
| 4.875 | 38.73 | 27.71 | tungsten light + a plurality of light sources (gold folding screen) |
| 4.375 | 32.70 | 23.95 | tungsten light + a plurality of light sources |
| 4.375 | 28.28 | 17.50 | tungsten light + a plurality of light sources |
| 4.750 | 38.29 | 30.31 | tungsten light + a |

TABLE 7-continued

| Average brightness | R − G | G − B | Photographing source |
|---|---|---|---|
| 5.125 | 33.99 | 28.49 | plurality of light sources (gold folding screen) tungsten light + a plurality of light sources (gold folding screen) |
| 4.625 | 35.87 | 32.29 | tungsten light + a plurality of light sources (gold folding screen) |
| 4.875 | 29.73 | 21.90 | tungsten light + a plurality of light sources |
| 4.250 | 33.58 | 21.69 | tungsten light + a plurality of light sources |
| 4.250 | 33.41 | 21.41 | tungsten light + a plurality of light sources |
| 5.000 | 33.62 | 30.40 | tungsten light + a plurality of light sources (gold folding screen) |
| 4.000 | 28.31 | 23.73 | tungsten light + outer light (yellow background) |
| 4.500 | 28.64 | 21.90 | tungsten light + outer light (yellow background) |
| 4.375 | 29.61 | 22.42 | tungsten light + outer light (yellow background) |
| 3.875 | 32.79 | 14.69 | tungsten light + outer light (yellow background) |
| 5.625 | 35.44 | 8.68 | direct photography tungsten light source |

Further, all of 5 frames in which the color balance belongs to the tungsten light region and in which the average brightness BV exceeds 6.0 [EV], were photographed under daylights low in color temperature (evening sun) or under a great influence by object colors of a subject, as represented in Table 8 shown below.

TABLE 8

| Average brightness | R - G | G - B | Photographing source |
|---|---|---|---|
| 7.875 | 28.02 | 9.75 | daylight (red flower) |
| 7.250 | 23.01 | 15.63 | evening sun |
| 7.500 | 21.24 | 17.54 | evening sun |
| 8.625 | 37.89 | 12.70 | daylight (red leaves) |
| 7.875 | 25.98 | 10.58 | daylight (object with orange color) |

Thus, the type of subject illuminating light can be estimated with considerably high accuracy by adopting 3 [EV] and 6 [EV] as reference values of the average brightness for the tungsten light region.

The color regions, which defines the fluorescent-lamp region and the tungsten light region, and the reference values of the average brightness for the fluorescent-lamp region and the tungsten light region are respectively stored in memory means provided in the control circuit.

Next, a printing control routine executed by the microcomputer in the present embodiment, will be described below.

Figure 4:
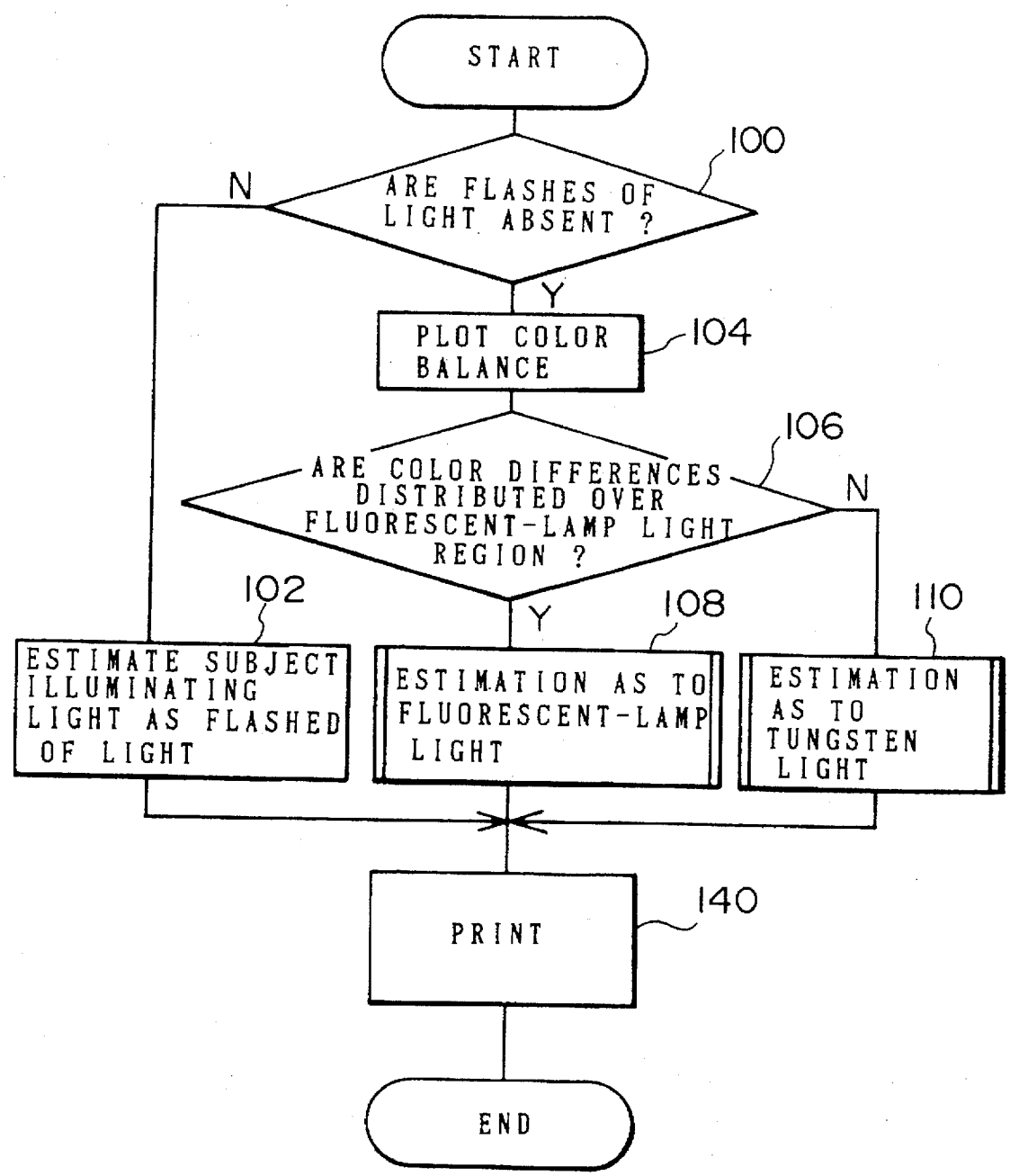
FIG. 4 is a flowchart for describing a print processing routine executed by one embodiment of the present invention.

When the negative film 20 is fed, the magnetic information recorded on the magnetic track is read by the magnetic head 14 and a printing frame is positioned to a printing position. FIG. 4 shows a print processing routine in the present embodiment. It is determined in Step 100 based on the information indicative of the presence or absence of flashes of light, which has been read by the magnetic head 14, whether the flashes of light exist, if the flashes of light exist, it is then estimated in Step 102 that the subject illuminating light is the flashes of light. If the flashes of light do not exist, then the average value of densities of three colors on the printing frame is calculated based on image information detected by the image sensor 30 in Step 104 and R–G and G–B each corresponding to a color difference in the average value are calculated. Further, R–G and G–B are plotted on the color coordinates. It is next estimated in Step 106 whether the plotted R–G and G–B are distributed over the fluorescent-lamp light region or the tungsten light region shown in FIG. 3. If they are distributed over the fluorescent-lamp light region, an estimation as to the fluorescent-lamp light is performed in Step 108. If they are distributed over the tungsten light region, an estimation as to the tungsten light is performed in Step 110.

Figure 5:
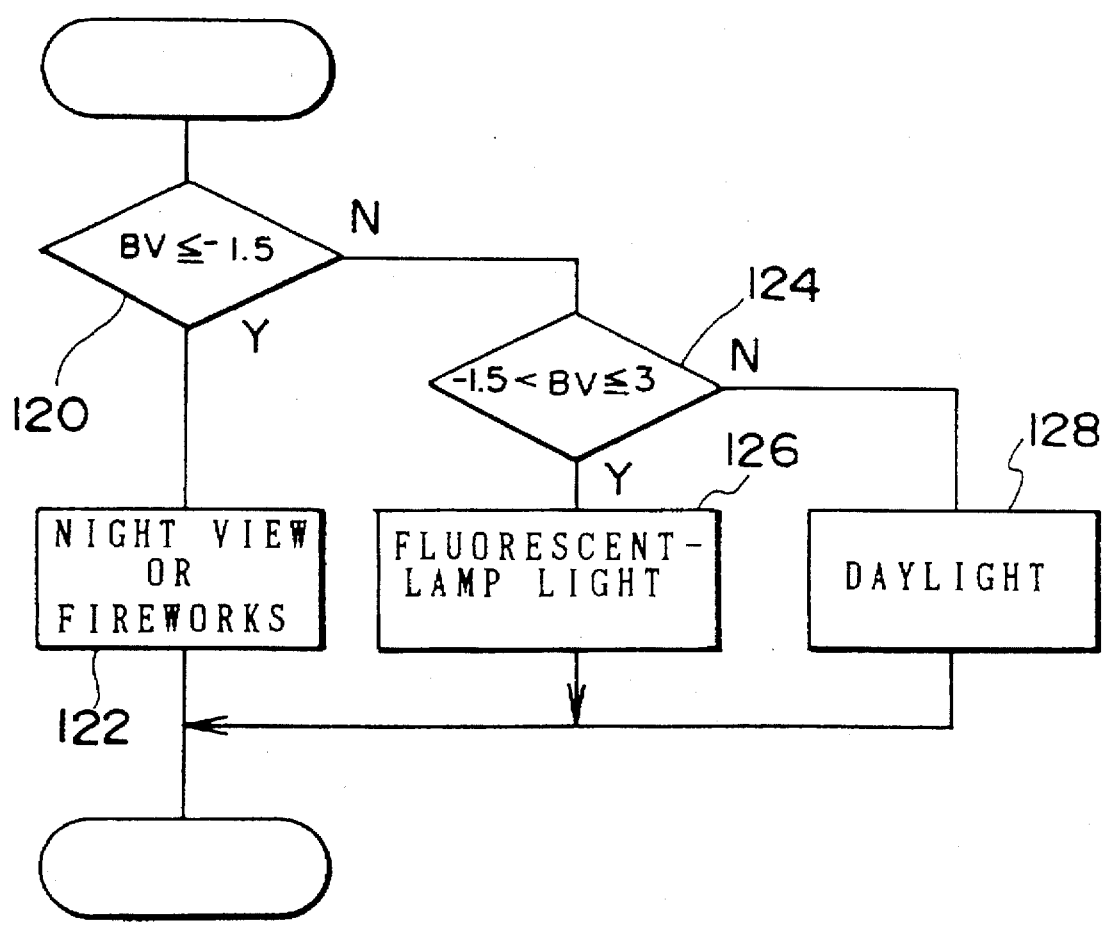
FIG. 5 is a flowchart for describing the details of a step 108 shown in FIG. 4.

FIG. 5 shows the details of the estimation as to the fluorescent-lamp light in Step 108. It is determined in Step 120 based on the symbol read by the magnetic head 14 whether the average brightness BV is less than or equal to −1.5 [EV]. If BV≦−1.5 [EV], the subject illuminating light is then estimated as light-source light other than fluorescent-lamp light, such as the night view or the fireworks.

it is determined in Step 124 whether the average brightness BV is −1.5 [EV]<BV≦3 [EV]. If the answer is YES in Step 124, then the subject illuminating light is estimated as the fluorescent-lamp light in Step 126. If 3 [EV]<BV, it is then estimated in Step 128 that the subject illuminating light is daylight which is producing a green failure.

Figure 6:
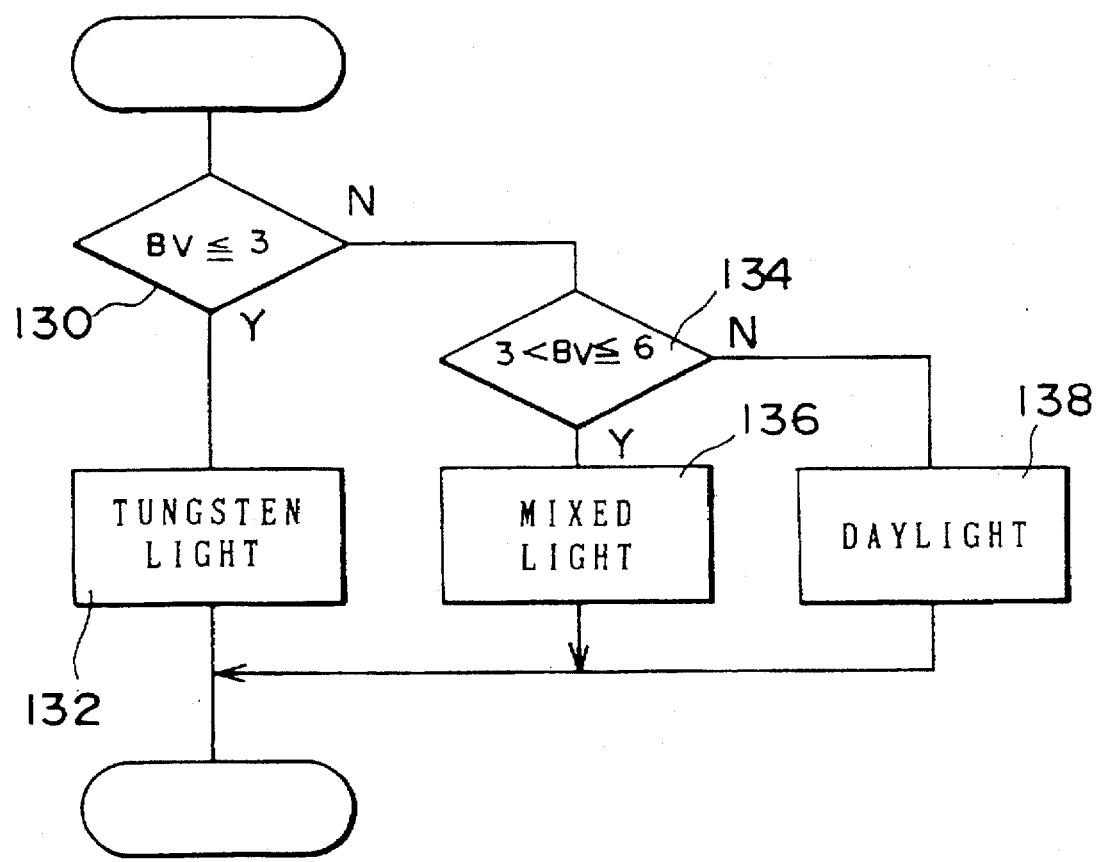
FIG. 6 is a flowchart for describing the details of a step 110 shown in FIG. 4.

FIG. 6 shows the details of the estimation as to the tungsten light in Step 110. It is determined in Step 130 based on the symbol read by the magnetic head 14 whether the average brightness BV is less than or equal to 3 [EV]. If BV≦3 [EV], then the subject illuminating light is estimated as the tungsten light in Step 132.

it is determined in Step 134 whether the average brightness BV is 3 [EV]<BV≦6 [EV]. If 3[EV]<BV≦6 [EV], then the subject illuminating light is estimated in Step 136 as light obtained by mixing principal tungsten light with light emitted from other light source. If 6 [EV]<BV, then the subject illuminating light is estimated as daylight low in color temperature or object-color light in Step 138.

Taking into consideration the type of the subject illuminating light estimated in Step 140 shown in FIG. 4 after the estimation of the subject illuminating light in the above-described manner, an exposure control value Ej is calculated based on the following equation (2), for example. Further, printing is performed by controlling the dimming filter 60 based on the exposure control value Ej.

$$\log E_j = S_j \{C_j (d_j - dw_j) + dw_j\} + K_j \quad (2)$$
$$\text{where } d_j = D_j - ND_j \quad (3)$$

$$dw_j = \left(\sum_{j=1}^{3} d_j\right)/3 \quad (4)$$

where j: any of numbers 1 to 3, which is indicative of any of R, G and B $D_j$: image density of film image frame to be printed (e.g., full-screen average density)

NDj: average image density of standard negative film or a number of film frames (e.g., average full-screen density)

Sj: slope control value

Cj: color correction value

Kj: constant dependent on printer, film and printing-paper characteristics

Ej: exposure control value corresponding to printing quantity of light

When a color tint or tone of subject illuminating light is reflected in a print, for example, a color correction value Cj of an image density which varies color tone due to a change in color temperature of the subject illuminating light, is set to a small value. By lowering the color correction value Cj in this way, a correction based on the color correction value Cj becomes weak or is not performed, when a subject is being illuminated by light (such as the evening sun, tungsten light or the like) low in color temperature. Namely, a film image frame is printed under lowered correction. When the color correction value Cj=0.5, for example, a correction to a color failure is executed but a light-source color correction is not executed, so that the tungsten light, for example, is color-reproduced as a strong YR tone. When the color collection value Cj=1.3, for example, in the case of a weak high-correction, only a light-source color correction is carried out without the color failure correction. Thus, when the subject illuminating light is of the tungsten light, a tungsten color remains. As described above, the tint or tone of the subject illuminating light can be reflected in the print by weakening or ceasing the correction based on the color correction value.

Since the information indicative of the average brightness at the time of the photography and the information indicative of the presence or absence of the flashes of light are recorded as described above, the present embodiment is suited to a fixed-focus type camera or an autofocusing compact camera.

Another embodiment of the present invention will now be described below. In the present embodiment, information indicative of average intensity or brightness obtained upon photography, information indicative of the presence or absence of flashes of light, photography magnification information and information about a distance to a subject are recorded on a magnetic track 16 on the camera side. When it is desired to perform a printing process, the four pieces of information are read and the degree of correction of image frames whose color balance is changed as in fluorescent-lamp light or tungsten light and which needs a color correction, is set as represented in Table 9 shown below.

TABLE 9

| Photography magnification | Distance to subject | |
| --- | --- | --- |
| | near | distant |
| large | correction value: large | correction value: medium |
| small | correction value: medium | correction value: small |

Described specifically, when the distance to the subject is near and the photography magnification is large, the correction degree is made greater based on the information about the subject distance and the photography magnification information. On the other hand, when the distance to the subject is near and the photography magnification is small and when the distance to the subject is distant and the photography magnification is large, the correction degree is set to the medium. Further, when the distance to the subject is distant and the photography magnification is small, the correction degree is reduced.

Since the information about the distance to the subject and the photography magnification information as well as the information indicative of the average brightness obtained upon photography and the information indicative of the presence or absence of the flashes of light are recorded, the present embodiment is suitable for use in an AF single-lens reflex camera.

According to the present invention, as has been described above, since the type of the subject illuminating light is estimated using the minimum amount of on-photography information and the printing process is performed, an advantageous effect can be obtained which is capable of making the finish quality of a print satisfactory.

While the embodiments of the present invention, as herein disclosed, constitute a preferred form, it is to be understood that other forms might be adopted.

What we claim is:

1. A photoprinting method comprising:
   estimating the type of subject illuminating light based on information indicative of an average intensity obtained upon photography and on information indicative of the presence or absence of flashes of light;
   determining the amount of printing exposure according to the estimated type of subject illuminating light; and
   printing film images on a sheet of printing paper based on the determined amount of printing exposure.

2. The photoprinting method as claimed in claim 1, wherein the information indicative of the average intensity obtained upon photography and the information indicative of the presence or absence of the flashes of light are recorded on a magnetic layer applied on a negative film.

3. A photoprinting method comprising:
   predefining a plurality of regions corresponding to subject illuminating light on color coordinates, based on three R, G and B color density values of a number of film images;
   determining whether the three R, G and B color density values of a film image to be printed belongs to any of said plurality of predefined regions, and estimating the type of the subject illuminating light from the determination; and
   determining the amount of printing exposure according to the estimated type of subject illuminating light to thereby print the film image on a sheet of printing paper according to the determined amount of printing exposure.

4. The photoprinting method as claimed in claim 3, wherein said plurality of regions include a fluorescent-lamp light region in which fluorescent-lamp light is included as the subject illuminating light and a tungsten light region in which tungsten light is included as the subject illuminating light.

5. A photoprinting method comprising:
   predefining a plurality of regions corresponding to subject illuminating light on color coordinates, based on three R, G and B color density values of a number of film images;
   predetermining at least one reference average intensity for each of said plurality of regions;
   measuring an amount of three R, G and B color density values of a film image when the film image is printed;
   determining whether the measured amount belongs to any of said plurality of predetermined regions;

reading information indicative of an average intensity of said printing film image, which is obtained upon photography;

comparing the read average intensity obtained upon the photography and at least one reference average intensity predefined for that region, among the plurality of regions, to which the measured amount of R, G and B color density values belongs, and estimating the type of the subject illuminating light from the result of said comparison; and determining the amount of printing exposure according to the estimated type of subject illuminating light to thereby print the film image on a sheet of printing paper according to the determined amount of printing exposure.

6. The photoprinting method as claimed in claim 5, wherein said plurality of regions include a fluorescent-lamp light region in which fluorescent-lamp light is included as the subject illuminating light, and a tungsten light region in which tungsten light is included as the subject illuminating light.

7. The photoprinting method as claimed in claim 6, further including:

defining a first predetermined value and a second predetermined value greater than the first predetermined value as said at least one reference average intensity in said fluorescent-lamp light region, and estimating in said fluorescent-lamp light region that when the average intensity obtained upon photography is less than or equal to the first predetermined value, the subject illuminating light is a scene in which a night view or fireworks have been photographed, that when the average intensity is greater than the first predetermined value and is less than or equal to the second predetermined value, the subject illuminating light is the fluorescent-lamp light, and that when the average intensity is greater than the second predetermined value, the subject illuminating light is daylight; and defining a third predetermined value and a fourth predetermined value greater than the third predetermined value as said at least one reference average intensity in said tungsten light region and estimating in said tungsten light region that when the average intensity obtained upon photography is less than or equal to the third predetermined value, the subject illuminating light is the tungsten light, that when the average intensity is greater than the third predetermined value and is less than or equal to the fourth predetermined value, the subject illuminating light is light obtained by mixing the tungsten light used as a principal part with light emitted from other light source, and that when the average intensity is greater than the fourth predetermined value, the subject illuminating light is daylight low in color temperature or an object color.

8. The photoprinting method as claimed in claim 7, wherein the first, second, third and fourth predetermined values each defined as the at least one reference average intensity are −1.5 EV, 3 EV, 3 EV and 6 EV respectively.

9. The photoprinting method as claimed in claim 5, wherein the information indicative of the average intensity obtained upon photography is read from a magnetic layer applied on a film.

10. A photoprinting method of correcting the amount of printing exposure determined abased on three R, G and B color density values of a film image to be printed to thereby print the film image on a sheet of printing paper according to the determined amount of printing, comprising:

increasing the degree of correction of the amount of printing exposure based on information indicative of a distance to a subject and of a photography magnification when the distance to the subject is near and the photography magnification is large;

setting the degree of correction of the amount of printing exposure to a medium value when the distance to the subject is near and the photography magnification is small, and when the distance to the subject is distant and the photography magnification is large; and reducing the degree of correction of the amount of printing exposure when the distance to the subject is distant and the photography magnification is small.

11. A photoprinting method of correcting the amount of printing exposure determined based on three R, G and B color density values of a film image to be printed to thereby print the film image on a sheet of printing paper according to the determined amount of printing exposure, comprising:

estimating the type of subject illuminating light based on information indicative of an average intensity obtained upon photography and on information indicative of the presence or absence of flashes of light, and varying the degree of correction of the amount of printing exposure according to the estimated type of subject illuminating light; and increasing the degree of correction of the amount of printing exposure based on information indicative of a distance to a subject and a photography magnification when the distance to the subject is near and the photography magnification is large, setting the degree of correction of the amount of printing exposure to a medium value when the distance to the subject and the photography magnification are near and small, respectively, and when the distance to the subject and the photography magnification are distant and large, respectively, and reducing the degree of correction of the amount of printing exposure when the distance to the subject is distant and the photography magnification is small.

12. A photoprinting method of correcting the amount of printing exposure determined based on three R, G and B color density values of a film image to be printed to thereby print the film image on a sheet of printing paper according to the determined amount of printing exposure, comprising:

predefining a plurality of regions corresponding to subject illuminating light on color coordinates, based on three R, G and B color density values of a number of film images;

determining whether the three R, G and B color density values of a film image to be printed belongs to any of said plurality of regions, and estimating the type of subject illuminating light from the determination;

varying the degree of correction of the amount of printing exposure according to the estimated type of subject illuminating light; and increasing the degree of correction of the amount of printing exposure based on information indicative of a distance to a subject and a photography magnification when the distance to the subject is near and the photography magnification is large, setting the degree of correction of the amount of printing exposure to a medium value when the distance to the subject and the photography magnification are near and small, respectively, and when the distance to the subject and the photography magnification are distant and large, respectively, and reducing the degree of correction of the amount of printing exposure when the distance to the subject is distant and the photography magnification is small.

13. A photoprinting method of correcting the amount of printing exposure determined based on three R, G and B color density values of a film image to be printed to thereby print the film image on a sheet of printing paper according to the determined amount of printing exposure, comprising:

predefining a plurality of regions corresponding to subject illuminating light on color coordinates, based on three R, G and B color density values of a number of film images;

predetermining at least one reference average intensity for each of said plurality of regions;

measuring the three R, G and B color density values of a film image when the film image is printed;

determining whether the measured feature amount belongs to any of said plurality of predetermined regions;

reading information indicative of an average intensity of said printing film image, which is obtained upon photography;

comparing the read average intensity obtained upon the photography and at least one reference average intensity predefined for that region, among the plurality of regions, to which the measured amount of R, G and B color density values belongs, and estimating the type of the subject illuminating light from the result of said comparison; and varying the degree of correction of the amount of printing exposure according to the estimated type of subject illuminating light; and increasing the degree of correction of the amount of printing exposure based on information indicative of a distance to a subject and a photography magnification when the distance to the subject is near and the photography magnification is large, setting the degree of correction of the amount of printing exposure to a medium value when the distance to the subject and the photography magnification are near and small, respectively, and when the distance to the subject and the photography magnification are distant and large, respectively, and reducing the degree of correction of the amount of printing exposure when the distance to the subject is distant and the photography magnification is small.

* * * * *